(12) United States Patent
Kim et al.

(10) Patent No.: US 9,910,212 B2
(45) Date of Patent: Mar. 6, 2018

(54) MANUFACTURING METHOD OF DISPLAY PANEL AND DISPLAY DEVICE HAVING THE DISPLAY PANEL

(71) Applicant: Samsung Display Co., LTD., Yongin-si, Gyeonggi-Do (KR)

(72) Inventors: Taeeun Kim, Asan-si (KR); Jinse Kim, Gwangmyeong-si (KR); Yisoo Won, Asan-si (KR); Donghun Lee, Asan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 10 days.

(21) Appl. No.: 15/132,543

(22) Filed: Apr. 19, 2016

(65) Prior Publication Data

US 2017/0038519 A1    Feb. 9, 2017

(30) Foreign Application Priority Data

Aug. 6, 2015    (KR) .................. 10-2015-0111159

(51) Int. Cl.
*F21V 8/00* (2006.01)
*G02F 1/1335* (2006.01)
*G02F 1/1333* (2006.01)

(52) U.S. Cl.
CPC ......... *G02B 6/0065* (2013.01); *G02B 6/0035* (2013.01); *G02F 1/133305* (2013.01);
(Continued)

(58) Field of Classification Search
CPC .... G02B 6/0053; G02B 6/0055; G02B 6/005; G02B 6/0016; G02B 6/0028; G02B 6/0031; G02B 6/0073; G02B 6/0025; G02B 6/003; G02B 6/0046; G02B 6/0088; G02B 6/0018; G02B 6/002; G02B 6/0023; G02B 6/0063; G02B 6/0095; G02B 6/122; G02B 6/2848; G02B 6/0011; G02B 6/0051; G02B 6/10; G02B 6/00; G02B 6/0001; G02B 6/001; G02B 6/0033; G02B 6/0043; G02B 1/041; G02B 27/2214; G02B 27/0172; G02B 5/0252; G02B 5/1819;
(Continued)

(56) References Cited

U.S. PATENT DOCUMENTS 5,521,726 A * 5/1996 Zimmerman ........ G02B 5/3025
349/159
9,213,195 B2 * 12/2015 Watanabe ............. G02F 1/1333
(Continued)

FOREIGN PATENT DOCUMENTS

KR       101196231 B1     10/2012
KR    1020140030382 A      3/2014
(Continued)

*Primary Examiner* — Thoi Duong
(74) *Attorney, Agent, or Firm* — Cantor Colburn LLP

(57) ABSTRACT

A display device includes a light source which emits a light and a display panel which displays an image using the light. The display panel includes a first substrate, a second substrate spaced apart from the first substrate, a plurality of pixels disposed between the first and second substrates, and a light guide layer disposed between the first substrate and the pixels. The light guide layer includes light tunnels which receive the light from the light source and a refractive layer which covers the light tunnels.

17 Claims, 13 Drawing Sheets

(52) U.S. Cl.
CPC ........ *G02F 1/133528* (2013.01); *G02B 6/001* (2013.01); *G02B 6/0055* (2013.01); *G02B 6/0078* (2013.01); *G02F 2001/133548* (2013.01)

(58) Field of Classification Search
CPC .... G02B 2006/121; G02B 3/00; G02B 3/005; G02B 3/0037; G02B 2027/0118; H01L 27/14625; H01L 27/14627; H01L 27/14629; H01L 27/1464; H01L 31/02327; H01L 33/58; H01L 33/60; F21Y 2115/10; F21Y 2101/00; F21Y 2105/00; G02F 1/1333; G02F 1/133345; G02F 1/133305; G02F 1/025; G02F 1/1335; G02F 1/133504; G02F 1/133512; G02F 1/133514; G02F 1/133524; G02F 1/1336; G02F 1/133611; G02F 1/13363; G02F 1/133615; G02F 1/133603; G02F 1/01708; G02F 1/13; G02F 1/133528; G02F 1/133553; G02F 1/133602; G02F 1/133605; G02F 1/133606; G02F 1/133621; G02F 1/1339; G02F 1/1343; G02F 1/134309; G02F 1/134363; G02F 1/136; G02F 1/19; G02F 2001/133607; G02F 2001/0151; G02F 2001/133548; G09G 2320/066; G09G 2320/0452; G09G 3/2003; G09G 3/36; H01S 5/183; H01S 5/02284; H01S 5/02288; H01S 5/0267; H01S 5/22; H01S 5/0287; H01S 5/1003; H01S 5/101; H01S 5/1025; H01S 5/14; H01S 5/3216; H01S 5/3412; H01S 3/063; H01S 3/067; H01S 3/08009; H01S 3/30
USPC ......... 362/606, 611, 19, 355, 554, 610, 612, 362/615, 97.2; 385/131, 14; 438/27, 31, 438/32, 65; 349/62, 61, 64, 65, 96, 95, 349/43, 106, 139, 141, 138, 158; 359/558; 372/50.23
See application file for complete search history.

(56) References Cited

U.S. PATENT DOCUMENTS

| 2005/0140873 | A1* | 6/2005 | Hong | ................. | G02B 6/06 349/114 |
| 2006/0203145 | A1* | 9/2006 | Cho | ................. | G02F 1/133603 349/62 |
| 2013/0270223 | A1* | 10/2013 | Lee | ................. | G03F 7/031 216/24 |

FOREIGN PATENT DOCUMENTS

| KR | 1020140074463 A | 6/2014 |
| KR | 1020150001022 A | 1/2015 |
| KR | 1020150011708 A | 2/2015 |
| KR | 1020150024985 A | 3/2015 |

* cited by examiner

MANUFACTURING METHOD OF DISPLAY PANEL AND DISPLAY DEVICE HAVING THE DISPLAY PANEL

This application claims priority to Korean Patent Application No. 10-2015-0111159, filed on Aug. 6, 2015, and all the benefits accruing therefrom under 35 U.S.C. § 119, the content of which in its entirety is herein incorporated by reference.

BACKGROUND

1. Field

The disclosure relates to a display device. More particularly, the disclosure relates to a method of manufacturing a display panel including an optical member and a display device including the display panel.

2. Description of the Related Art

A display device includes a display panel for displaying an image. The display panel typically includes a plurality of gate lines, a plurality of data lines, and a plurality of pixels connected to the gate lines and the data lines. The display device may further include a gate driver for applying gate signals to the gate lines, respectively, and a data driver for applying data signals to the data lines, respectively.

In addition, the display device may include a light source for providing a light to the display panel. The light source typically includes a light source part for emitting the light and a plurality of optical members, such as a light guide plate for guiding the light to the display panel.

In recent years, as the display device becomes thinner, researches have been carried out to reduce a thickness of the light source. Thus, a display panel including optical members, which are generally included in the light source, has been studied.

SUMMARY

The disclosure provides a method of manufacturing a display panel including optical members.

The disclosure provides a display device including the display panel.

According to an embodiment of the inventive concept, a display device includes a light source which emits light and a display panel which displays an image using the light. In such an embodiment, the display panel includes a first substrate, a second substrate disposed to be spaced apart from the first substrate, a plurality of pixels disposed between the first substrate and the second substrate, and a light guide layer disposed between the first substrate and the pixels. In such an embodiment, the light guide layer includes a plurality of light tunnels which receives the light from the light source and a refractive layer which covers the light tunnels.

In an embodiment, the display device may further include a first polarizing layer disposed on the light guide layer and a second polarizing layer disposed to be spaced apart from the first polarizing layer such that the pixels are disposed between the first and second polarizing layers. In such an embodiment, one polarizing layer of the first polarizing layer and the second polarizing layer may include a plurality of grid patterns.

In an embodiment, the one polarizing layer including the grid patterns may be disposed on the light guide layer.

In an embodiment, the other polarizing layer of the first and second polarizing layers may be disposed on the second substrate.

In an embodiment, the display device may further include a reflection layer disposed between the first substrate and the light guide layer.

In an embodiment, the light tunnels may be disposed on the reflection layer and spaced apart from each other at regular intervals.

In an embodiment, the light tunnels may have a refractive index higher than a refractive index of the refractive layer.

In an embodiment, the light tunnels may include a transparent conductive oxide material.

In an embodiment, the refractive layer is a transparent organic insulating layer.

In an embodiment, the first substrate includes a metal material.

In an embodiment, the light source may include a printed circuit board and a light emitting device disposed on the printed circuit board and facing a side surface of the light guide layer, and the light emitting device may emit the light through the side surface of the light guide layer.

In an embodiment, the display panel may be curved in a direction.

According to another embodiment of the inventive concept, a manufacturing method of the display panel includes preparing a first substrate, providing a light guide layer on the first substrate, providing a plurality of pixels on the light guide layer, preparing a second substrate, and coupling the first substrate and the second substrate. In such an embodiment, the providing the light guide layer includes providing the light tunnels on the first substrate and providing a refractive layer on the first substrate to cover the light tunnels.

In an embodiment, the method may further include providing a first polarizing layer on the light guide layer. In such an embodiment, the providing the first polarizing layer includes providing a plurality of grid patterns on the refractive layer and providing a first insulating layer to cover the grid patterns.

In an embodiment, the method may further include providing a second polarizing layer disposed to be spaced apart from the first polarizing layer on the second substrate such that the pixels are disposed between the first polarizing layer and the second polarizing layer.

In an embodiment, the method may further include providing a reflection layer on the first substrate, and the reflection layer may be disposed between the first substrate and the light guide layer.

In an embodiment, the light tunnels may have a refractive index higher than a refractive index of the refractive layer.

In an embodiment, the first substrate may include a metal material.

In an embodiment, the light tunnels may include a transparent conductive oxide material.

According to embodiments described herein, the overall thickness of the display device may be reduced, and this may be applied to a curved and flexible display device.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
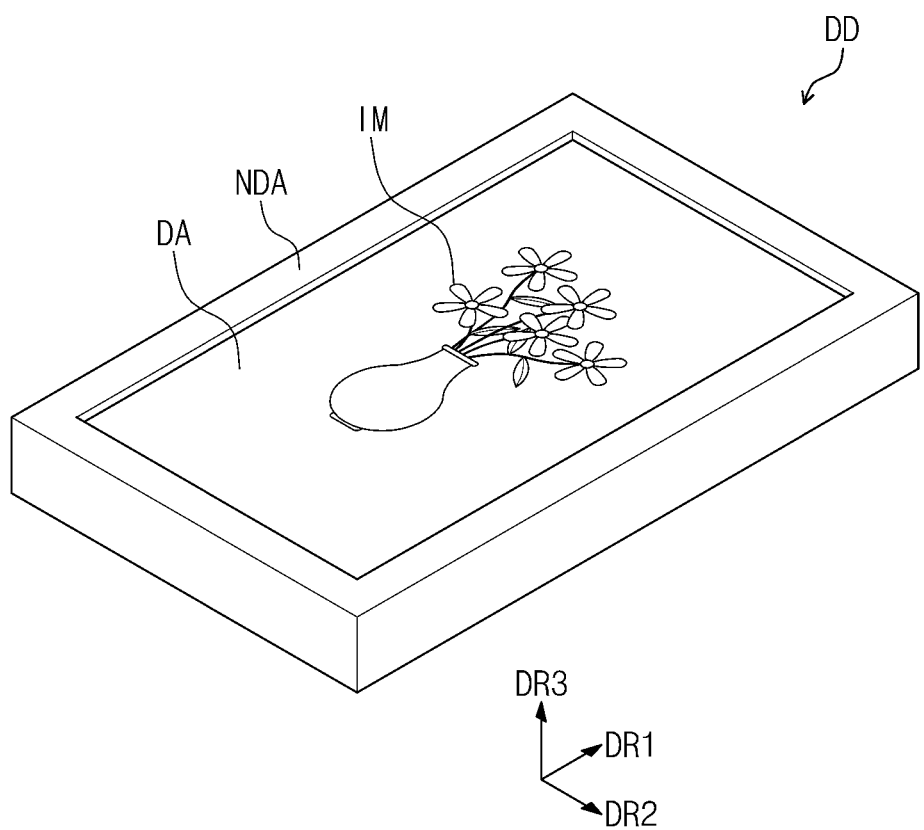
FIG. 1 is a perspective view showing a display device according to an exemplary embodiment of the disclosure.

The invention now will be described more fully hereinafter with reference to the accompanying drawings, in which various embodiments are shown. The invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. "Or" means "and/or." As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the disclosure. As used herein, the singular forms, "a", "an" and "the" are intended to include the plural forms as well, unless the context clearly indicates otherwise. It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

Figure 2:
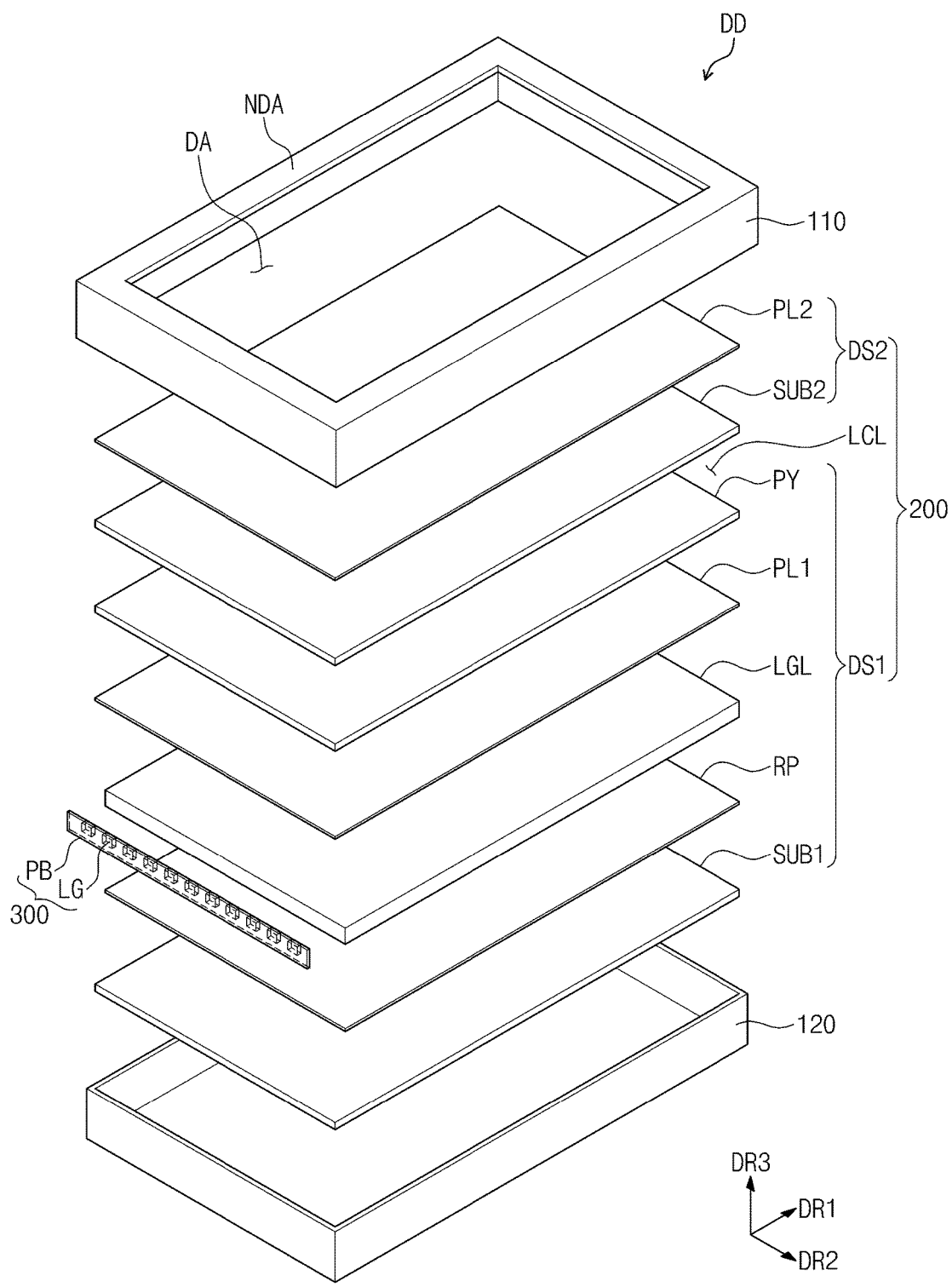
FIG. 2 is an exploded perspective view showing a display device according to an exemplary embodiment of the disclosure.

FIG. 1 is a perspective view showing a display device DD according to an exemplary embodiment of the disclosure. FIG. 2 is an exploded perspective view showing the display device DD according to an exemplary embodiment of the disclosure.

An exemplary embodiment of the display device DD shown in FIG. 1 may be applied to a large-sized electronic item, such as a television set, an outdoor billboard, etc., or a small and medium-sized electronic gadget, such as a personal computer, a notebook computer, a navigation unit, a camera, etc. Such an embodiment of the display device DD may be applied to a tablet computer, a smart phone, a personal digital assistant, a portable multimedia player, a game unit, a wrist-type electronic device, etc., but is not limited thereto or thereby.

Referring to FIG. 1, an exemplary embodiment of the display device DD includes a display surface, which may be divided into a plurality of areas. The display device DD includes a display area DA in which an image IM is displayed and a non-display area NDA disposed adjacent to the display area DA. In one exemplary embodiment, for example, the display area DA may have a substantially quadrangular shape. The non-display area NDA may surround the display area DA. In such an embodiment, although not shown in figures, the display device DD may have a flexible shape. In one exemplary embodiment, for example, the display device DD may have a curved shape along a predetermined direction.

In an exemplary embodiment, as shown in FIG. 2, the display device DD includes a covering member 110, an accommodating member 120, a display panel 200, and a light source 300.

The covering member 110 is disposed on the display panel 200. The covering member 110 includes the display area DA through which the image displayed by the display panel 200 is shown and the non-display area NDA disposed adjacent to the display area DA. Although not shown in figures, the covering member 110 may include a window member which transmits the image to the outside through the display area DA.

The accommodating member 120 accommodates the display panel 200 and the light source 300 therein, and is coupled to the covering member 110.

The display panel 200 includes a first display substrate DS1, a second display substrate DS2, and a liquid crystal layer LCL. In an exemplary embodiment, the display device DD may be a transmissive type display device. In such an embodiment, the display panel 200 may be a liquid crystal display panel, an electrophoretic display panel, or an electrowetting display panel. Hereinafter, for convenience of description, an exemplary embodiment where the display panel 200 is the liquid crystal display panel will be described in detail, but not being limited thereto or thereby.

The first display substrate DS1 includes a first substrate SUB1, a reflection layer RP, a light guide layer LGL, a first polarizing layer PL1, and a pixel layer PY.

In an exemplary embodiment, the display panel 200 includes the reflection layer RP and the light guide layer LGL, which provide the light from a light source 300 to the pixel layer PY. In a conventional liquid crystal display device, a reflection layer and a light guide layer are included in a light source and provide a light emitted from a light emitting device to a display panel.

However, in an exemplary embodiment of the disclosure, the reflection layer RP and the light guide layer LGL are disposed in the display panel 200. In such an embodiment, the light source 300 may not include a backlight unit including an additional optical member that provides the light to the display panel 200. In such an embodiment, the light source 300 includes a light emitting device LG that generates the light and a printed circuit board PB on which the light emitting device LG is mounted.

In an exemplary embodiment, the display panel 200 includes the first substrate SUB1 disposed at a lowermost position. The first substrate SUB1 may include a transparent material or a non-transparent material.

In one exemplary embodiment, for example, the first substrate SUB1 may include a transparent substrate, such as a glass substrate, a plastic substrate, or a silicon substrate.

In one exemplary embodiment, for example, the first substrate SUB1 may include a non-transparent metal material. In such an embodiment, the light emitted from the light source 300 is provided to an upward direction of the first substrate SUB1. In such an embodiment, the light is provided to the pixel layer PY regardless of the material included in the first substrate SUB1.

In such an embodiment, the light source 300 may be realized as an edge-illumination type light source emitting the light to a side surface of the display panel 200. The light generated from the light emitting device LG is transmitted to the pixel layer PY through a side surface of the light guide layer LGL disposed on the first substrate SUB1.

In an exemplary embodiment, where the first substrate SUB1 includes the metal material, the reflection layer RP may be omitted. In such an embodiment, the first substrate SUB1 including the metal material may serve as the reflection layer RP.

In an exemplary embodiment, the first substrate SUB1 may have a flexible property. In one exemplary embodiment, for example, the first substrate SUB1 and the second substrate SUB2 each may be flexible, and the display device DD may be curved along a first direction DR1 or a second direction DR2. Herein, the first substrate SUB1 and the second substrate SUB2 may each independently have a Young's modulus (i.e., a tensile modulus) of about 0.01 to 300 gigaPascals (GPa), e.g., about 0.001 to about 1 GPa, or about 0.05 to about 0.5 GPa.

The reflection layer RP is disposed on the first substrate SUB1. The reflection layer RP reflects the light provided from the light guide layer LGL to the pixel layer PY.

The light guide layer LGL is disposed on the reflection layer RP. According to an exemplary embodiment, the light guide layer LGL includes a plurality of light tunnels. The light tunnels are disposed on the reflection layer RP and provide the light generated from the light source 300 to the first polarizing layer PL1. In one exemplary embodiment, for example, the light tunnels in the light guide layer LGL transmit the light to the outside due to a structure similar to that of an optical fiber. The light guide layer LGL will be described later in greater detail with reference to FIGS. 3 and 4.

The first polarizing layer PL1 is disposed on the light guide layer LGL and provides the light from the light guide layer LGL to the pixel layer PY. The first polarizing layer PL1 polarizes the light incident thereto from the light guide layer LGL. According to an exemplary embodiment, the first polarizing layer PL1 may be a wire grid polarizer including a plurality of grid patterns that polarizes the light incident thereto from the light guide layer LGL. The light polarized by the first polarizing layer PL1 is provided to the pixel layer PY. The first polarizing layer PL1 will be described later in greater detail with reference to FIG. 5.

The pixel layer PY is disposed on the first polarizing layer PL1. Although not shown in figures, the pixel layer PY may include a plurality of pixels disposed to correspond to the display area DA and a plurality of signal lines respectively connected to the pixels. The signal lines include a plurality of gate lines extending in the second direction DR2 and arranged in the first direction DR1. The signal lines further include a plurality of data lines extending in the first direction DR1 and arranged in the second direction DR2. The gate lines are insulated from the data lines while crossing the data lines.

The pixels are arranged substantially in a matrix form defined by rows in the first direction DR1 and columns in the second direction DR2. Each of the pixels is connected to a corresponding gate line of the gate lines and a corresponding data line of the data lines. Each pixel receives electrical signals from the corresponding gate line and the corresponding data line to generate the image.

In such an embodiment, each pixel includes a thin film transistor and a display element. According to an exemplary embodiment, where the display panel 200 is the liquid crystal display panel, the display element may be a liquid crystal capacitor.

In such an embodiment, the display panel 200 is not limited to a display panel operated in a specific mode. In an exemplary embodiment, the display panel 200 may be a panel that operates in one of a vertical alignment mode, a patterned vertical alignment mode, an in-plane switching mode, a fringe-field switching mode, and a plane-to-line switching mode.

The second display substrate DS2 includes a second substrate SUB2 and a second polarizing layer PL2.

The second substrate SUB2 is disposed on the pixel layer PY. The second substrate SUB2 may be a transparent substrate, such as a glass substrate, a plastic substrate, and a silicon substrate.

The second polarizing layer PL2 is disposed on the pixel layer PY. The second polarizing layer PL2 polarizes the image output from the pixel layer PY. Therefore, the image polarized by the second polarizing layer PL2 is displayed through the display area DA.

The light source 300 includes a plurality of light emitting devices LG and a printed circuit board PB on which the light emitting devices LG are disposed.

In an exemplary embodiment, where the display panel 200 includes the reflection layer RP and the light guide layer LGL as described above, the edge-illumination type light source 300 may not include an additional light guide member and an optical film. In such an embodiment, the optical film may include a diffusion sheet and a prism sheet. In an exemplary embodiment, the light guide layer LGL may function as the optical member of the optical film. In such an embodiment, the additional light guide member and the optical film may be omitted from the edge-illumination type light source 300, such that an overall thickness of the display device DD may be reduced.

Figure 3:
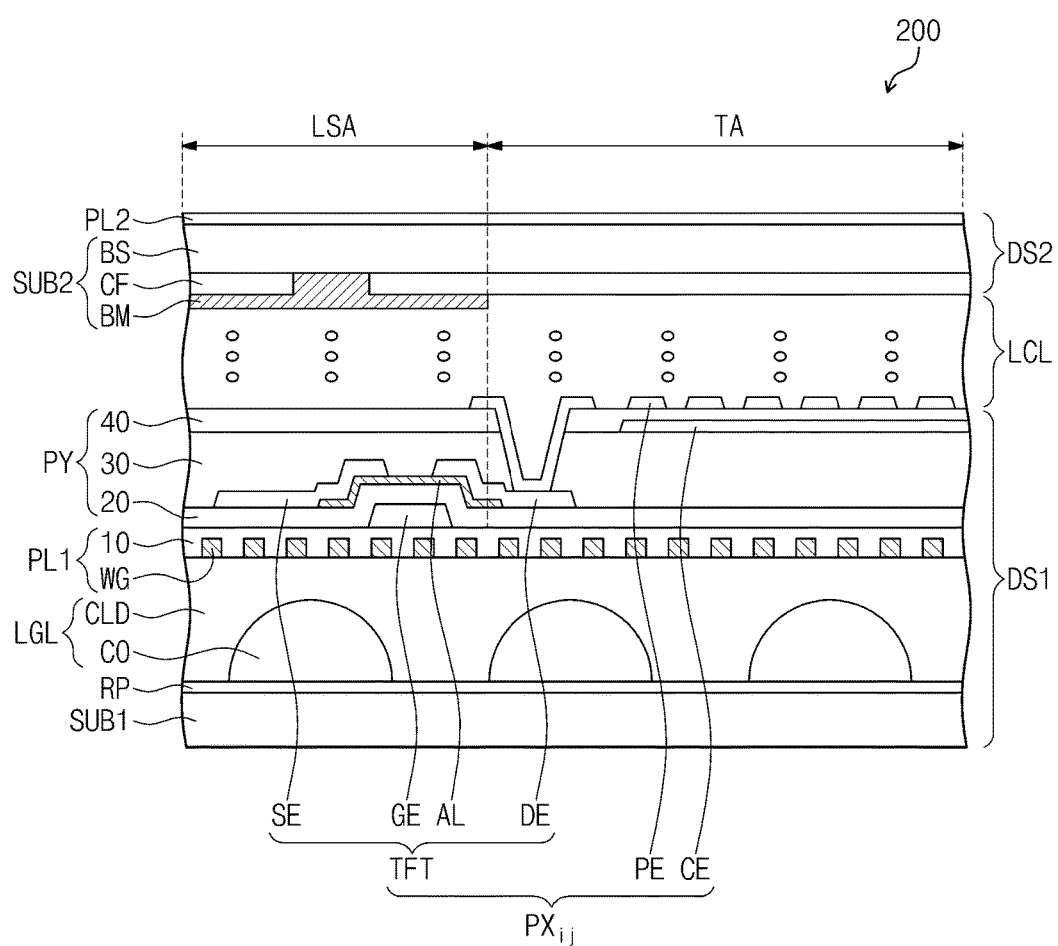
FIG. 3 is a cross-sectional view showing a pixel structure of a display panel shown in FIG. 2.
Figure 4:
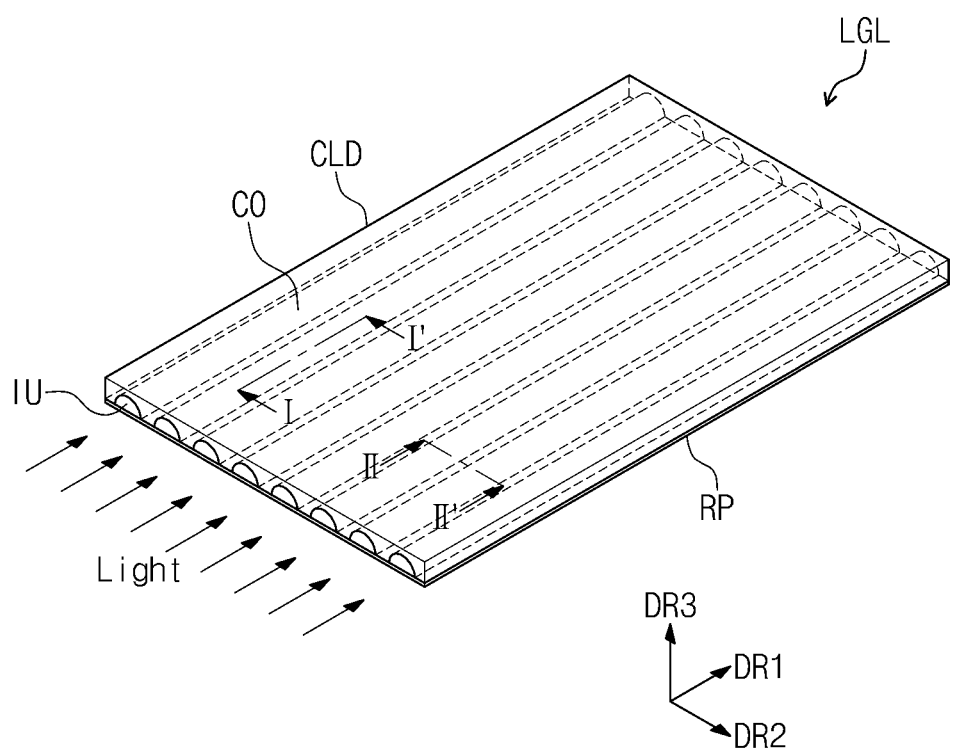
FIG. 4 is a perspective view showing a light guide layer shown in FIG. 2.
Figure 5:
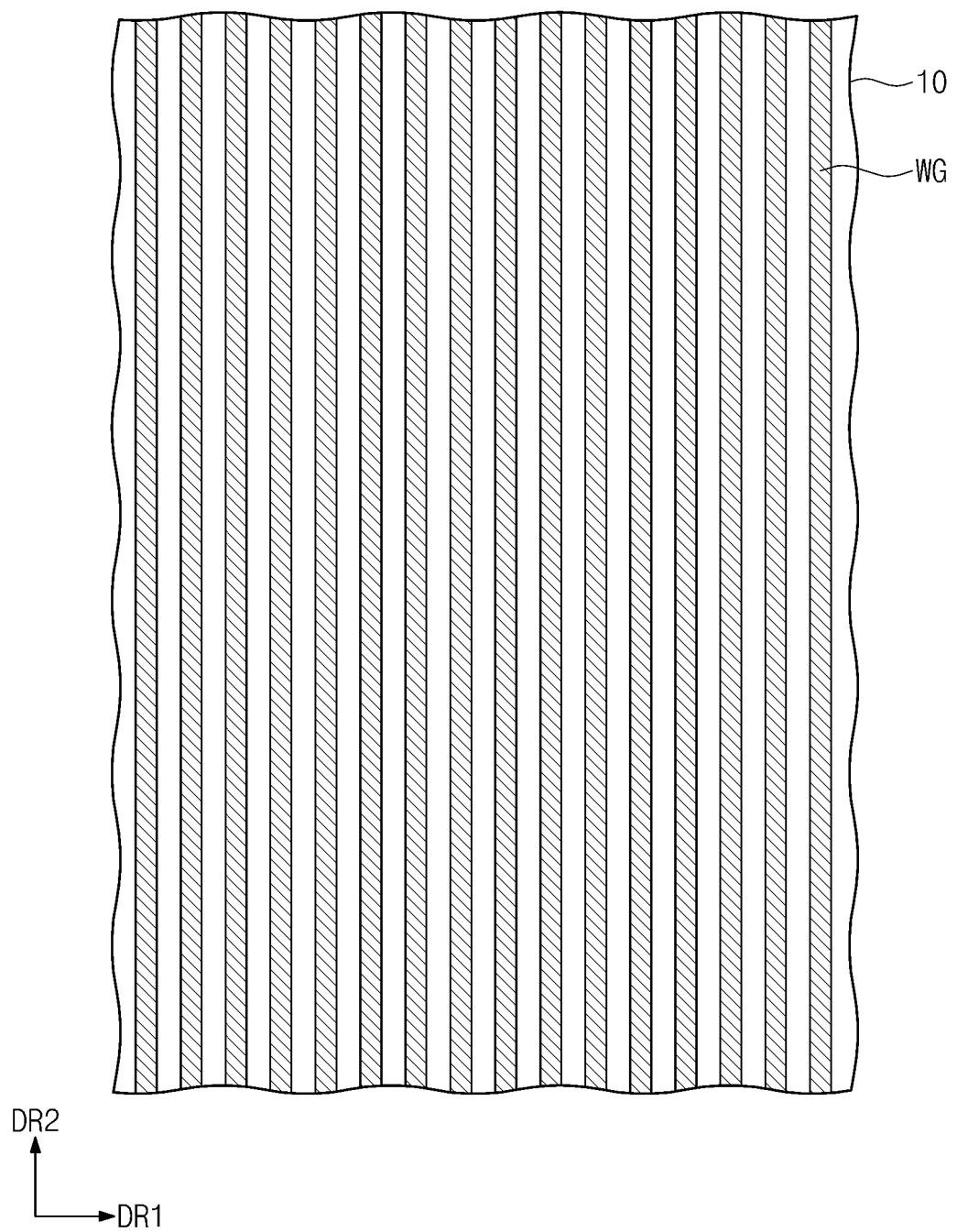
FIG. 5 is a plan view showing a first polarizing layer shown in FIG. 2.

FIG. 3 is a cross-sectional view showing a pixel structure of the display panel shown in FIG. 2. FIG. 4 is a perspective view showing the light guide layer shown in FIG. 2. FIG. 5 is a plan view showing the first polarizing layer shown in FIG. 2.

In one exemplary embodiment, for example, the pixel included in the pixel layer PY of the display panel 200 is driven in the plane-to-line switching PLS mode, as shown in FIG. 3, but not being limited thereto or thereby.

Referring to FIG. 3, in an exemplary embodiment, the first display substrate DS1 includes the first substrate SUB1, the reflection layer RP, the light guide layer LGL, the first polarizing layer PL1, and the pixel layer PY.

The reflection layer RP is disposed on the first substrate SUB1. The light guide layer LGL is disposed on the reflection layer RP. The light guide layer LGL includes the light tunnels CO disposed on the reflection layer RP and a refractive layer CLD covering the light tunnels CO.

In an exemplary embodiment, the refractive layer CLD may include a transparent organic insulating layer.

In an exemplary embodiment, as shown in FIG. 4, the light tunnels CO may be disposed on the reflection layer RP at regular intervals. However, the arrangement of the light tunnels CO on the reflection layer RP should not be limited thereto or thereby. The light tunnels CO extend in the first direction DR1 and are spaced apart from each other at regular intervals in the second direction DR2. In such an embodiment, the light tunnels CO may be disposed on the reflection layer RP with a semicircular shape, but the shape of the light tunnels CO should not be limited to the semicircular shape.

In one exemplary embodiment, for example, the light tunnels CO may include a transparent indium tin oxide. Alternatively, the light tunnels CO may include a transparent indium zinc oxide. However, the material included in the light tunnels CO should not be limited thereto or thereby, and the light tunnels CO may include various materials as long as the light tunnels CO guide the light.

The transparent refractive layer CLD is disposed on the light tunnels CO. The refractive layer CLD is disposed on the reflection layer RP to cover the light tunnels CO. In one exemplary embodiment, for example, the refractive layer CLD may be a transparent organic refractive layer, but not being limited thereto.

In an exemplary embodiment, the light tunnels CO have a refractive index higher than that of the refractive layer CLD. Here, the refractive index of the light tunnels CO is referred to as a first refractive index, and the refractive index of the refractive layer CLD is referred to as a second refractive index. Since the first refractive index is higher than the second refractive index, a total reflection may occur at a boundary surface between the light tunnels CO and the refractive layer CLD when the light LIGHT is incident to the light tunnels CO through an incident surface IU of the light tunnels CO.

Thus, the light LIGHT incident through the incident surface IU of the light tunnels CO is guided along the first direction DR1 due to the total reflection by the refractive layer CLD. In such an embodiment, since the light tunnels CO are arranged on the reflection layer RP at regular intervals, the light is effectively uniformly provided to an entire area of the display area DA.

Referring back to FIGS. 3 and 5, the first polarizing layer PL1 is disposed on the refractive layer CLD. The first polarizing layer PL1 includes the grid patterns WG and a first insulating layer 10. The grid patterns WG are arranged on the refractive layer CLD and spaced apart from each other with a predetermined distance or a regular interval. The first insulating layer 10 is disposed on the refractive layer CLD to cover the grid patterns WG.

The grid patterns WG transmit the light when a direction in which the light incident from the light guide layer LGL travels is substantially parallel to a polarization direction. The grid patterns WG reflect the light when the direction in which the light incident from the light guide layer LGL travels is not in parallel to the polarization direction.

In an exemplary embodiment, each of the grid patterns WG has a predetermined height. The grid patterns WG may have the same height as each other or the grid patterns WG may have different heights from each other. In one exemplary embodiment, for example, the grid patterns WG may have a height within a range from about 50 nanometers (nm) to about 150 nm.

In an exemplary embodiment, as shown in FIG. 5, each of the grid patterns WG has a substantially rectangular shape, but not being limited thereto or thereby. In an alternative exemplary embodiment, each of the grid patterns WG may have a substantially square shape or a trapezoid shape when viewed in a cross-sectional view.

The pixel layer PY includes the pixels, a second insulating layer 20, a third insulating layer 30, and a fourth insulating layer 40. In an exemplary embodiment, as shown in FIG. 3, each pixel PXij includes a thin film transistor TFT, a common electrode CE, and a pixel electrode PE.

A gate electrode GE of the thin film transistor TFT is disposed on the first insulating layer 10. Although not shown in figures, the gate electrode GE may be branched from the gate line. In such an embodiment, the gate electrode GE and the gate line include the same material and have the same layer structure. The gate electrode GE includes copper (Cu), aluminum (Al), a copper alloy, an aluminum alloy, or an alloy thereof.

The second insulating layer 20 is disposed on the first insulating layer 10 to cover the gate electrode GE. The second insulating layer 20 includes an organic material or an inorganic material.

A semiconductor layer AL is disposed on the second insulating layer 20 to overlap the gate electrode GE. In an exemplary embodiment, an ohmic contact layer (not shown) may further be disposed on the second insulating layer 20. A source electrode SE of the thin film transistor TFT is disposed on the second insulating layer 20. Although not shown in figures, the source electrode SE may be branched from the data line. In such an embodiment, the source electrode SE and the data line include the same material and have the same layer structure.

A drain electrode DE is disposed on the second insulating layer 20 and the drain electrode DE is spaced apart from the source electrode SE. Each of the source electrode SE and the drain electrode DE overlaps the semiconductor layer AL.

The third insulating layer 30 is disposed on the second insulating layer 20 to cover the source electrode SE and the drain electrode DE. The third insulating layer 30 provides a plane surface. The common electrode CE is disposed on the third insulating layer 30. In an alternative exemplary embodiment, the common electrode CE may be disposed on the second substrate SUB2 depending on an operation mode of the pixel PXij.

The fourth insulating layer 40 is disposed on the third insulating layer 30 to cover the common electrode CE. The pixel electrode PE is disposed on the fourth insulating layer 40 to overlap the common electrode CE. The pixel electrode PE is connected to the drain electrode DE through a penetrating hole CH defined through the third insulating layer 30 and the fourth insulating layer 40. A protection layer (not shown) that protects the pixel electrode PE and an alignment layer (not shown) may further be disposed on the fourth insulating layer 40.

The thin film transistor TFT outputs the data voltage provided through the data line in response to the gate signal provided through the gate line. The common electrode CE receives a common voltage, and the pixel electrode PE receives a pixel voltage corresponding to the data voltage. The common electrode CE and the pixel electrode PE may generate a lateral electric field. An arrangement of directors included in the liquid crystal layer CLD is changed by the lateral electric field.

The second display substrate DS2 includes the second substrate SUB2 and the second polarizing layer PL2.

The second substrate SUB2 includes a base substrate BS, a black matrix BM, and a color filter CF. The black matrix BM and the color filter CF are disposed under the base substrate BS. The color filter CF is disposed to overlap a transmission area TA. The color filter CF covers the transmission area TA when viewed in a plan view, and the color filter CF may partially overlap a light shielding area LSA. The color filter CF may have a red color, a green color, or a blue color.

The black matrix BM is disposed to overlap the light shielding area LSA. The black matrix BM is disposed in the light shielding area LSA and is not disposed in the transmission area TA.

The light shielding area LSA has a size that varies depending on a shape of the black matrix BM.

The second polarizing layer PL2 is disposed on the second substrate SUB2. In an exemplary embodiment, the first polarizing layer PL1 and the second polarizing layer PL2 are disposed to be spaced apart from each other, and the pixel PXij is disposed between the first polarizing layer PL1 and the second polarizing layer PL2. Each of the first and second polarizing layers PL1 and PL2 polarizes the light incident thereto.

Figure 6:
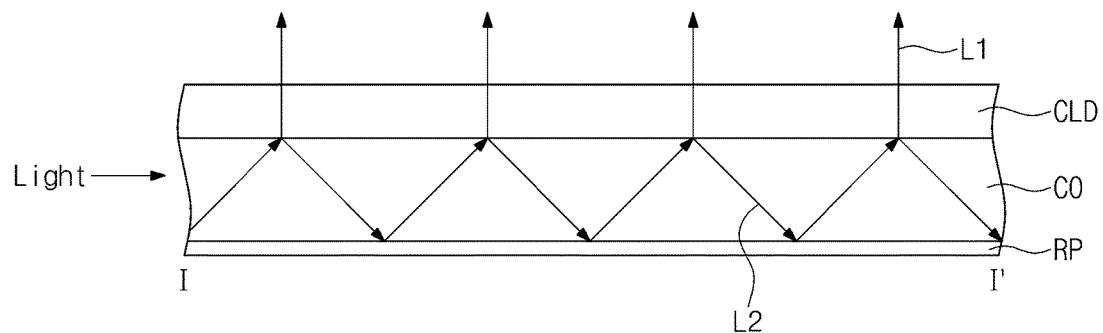
FIGS. 6 and 7 are cross-sectional views taken along line I-I' and line showing a core layer and a transmission layer of the light guide layer shown in FIG. 4.
Figure 7:
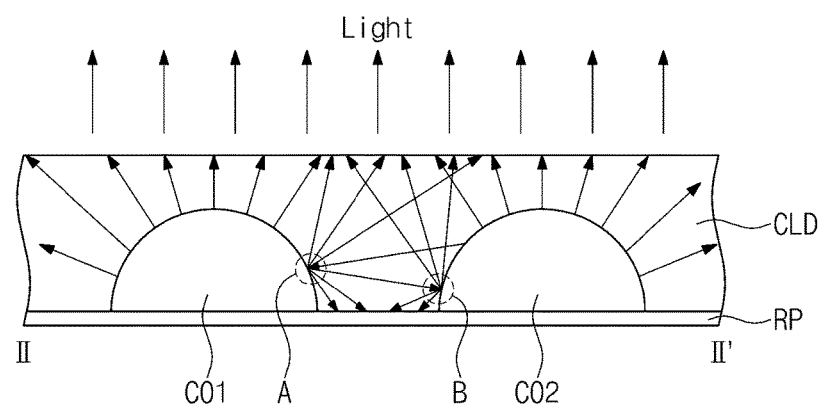

FIGS. 6 and 7 are cross-sectional views taken along line I-I' and line showing a core layer and a transmission layer of the light guide layer shown in FIG. 4.

In more detail, FIG. 6 is a cross-sectional view taken along a line I-I' of FIG. 4 and FIG. 7 is a cross-sectional view taken along a line II-IP of FIG. 4.

Referring to FIGS. 4 and 6, in an exemplary embodiment, the light LIGHT emitted from the light source 300 (refer to FIG. 2) is provided to an inside of the light tunnel CO through the incident surface IU of the light tunnel CO. In such an embodiment, where the refractive index of the light tunnel CO is higher than that of the refractive layer CLD, the total reflection may occur at the boundary surface between the light tunnel CO and the refractive layer CLD.

In such an embodiment, a light L1 corresponding to a portion of the light incident to the incident surface IU of the light tunnel CO is provided to the pixel layer PY (refer to FIG. 2) through the refractive layer CLD, and a light L2 corresponding to the other portion of the light incident to the incident surface IU of the light tunnel CO is reflected to the inside of the light tunnel CO by the boundary surface between the light tunnel CO and the refractive layer CLD.

In such an embodiment, the light L2 reflected by the boundary surface between the light tunnel CO and the refractive layer CLD is reflected again to the boundary surface between the light tunnel CO and the refractive layer CLD by the reflection layer RP disposed under the light tunnel CO. Thus, the light provided through the incident surface IU of the light tunnel CO is guided along the first direction DR1.

In such an embodiment, referring to FIG. 7, the light tunnels CO are disposed on the reflection layer RP at regular intervals, such that the light is uniformly provided over the entire area of the pixel layer PY when compared to a display device including a single light guide member.

In an exemplary embodiment, as the light tunnels CO are arranged on the reflection layer RP, the light exits through each of the light tunnels CO. Then, the light passing through each of the light tunnels CO is incident to another light tunnel and scattered.

In one exemplary embodiment, for example, when the light passing through a second light tunnel CO2 reaches to a surface of a first light tunnel CO1, the light is scattered as shown in a first area A shown in FIG. 7. Similarly, when the light passing through the first light tunnel CO1 reaches to a surface of the second light tunnel CO2, the light is scattered as shown in a second area B shown in FIG. 7.

In such an embodiment, as shown in FIG. 7, the light passing through one light tunnel is scattered by another light tunnel adjacent thereto, and the light travels various directions. Therefore, the light is uniformly provided over the entire area of the refractive layer CLD, and the light is uniformly provided over the entire area of the pixel layer PY.

FIGS. 8A to 8I are views showing a method of manufacturing a display panel according to an exemplary embodiment of the disclosure.

Figure 8A:
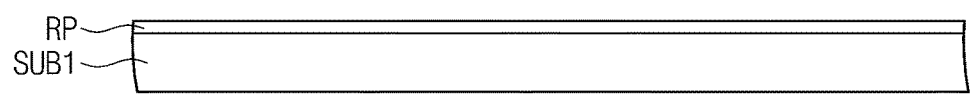
FIGS. 8A to 8I are views showing a method of manufacturing a display panel according to an exemplary embodiment of the disclosure.

Referring to FIG. 8A, the first substrate SUB1 is prepared and the reflection layer RP is provided or disposed on the first substrate SUB1.

Figure 8B:
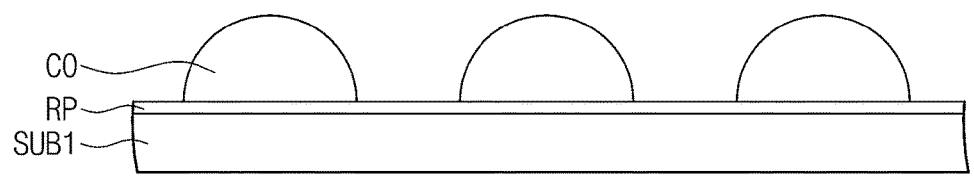
Figure 8C:
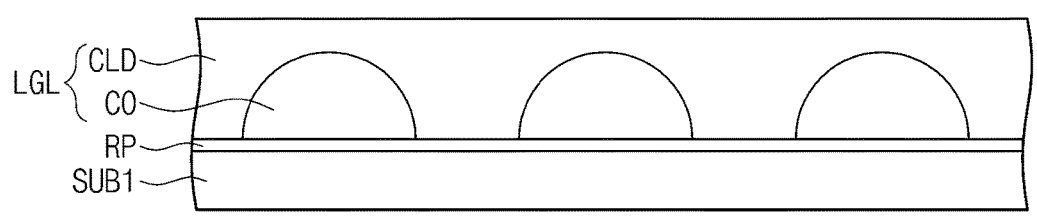

Referring to FIGS. 8B and 8C, the light guide layer LGL is provided or formed on the reflection layer RP. In an exemplary embodiment, the transparent light tunnels CO are provided or formed on the reflection layer RP. In such an embodiment, the light tunnels CO are provided or formed on the reflection layer RP at regular intervals. In such an embodiment, the refractive layer CLD is disposed on the reflection layer RP to cover the light tunnels CO. The refractive layer CLD may be a transparent organic refractive layer.

Figure 8D:
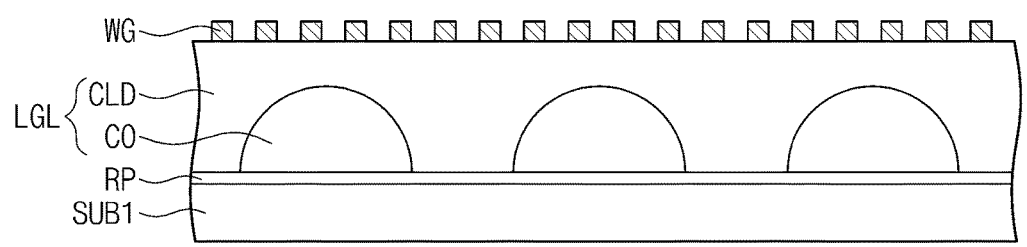
Figure 8E:
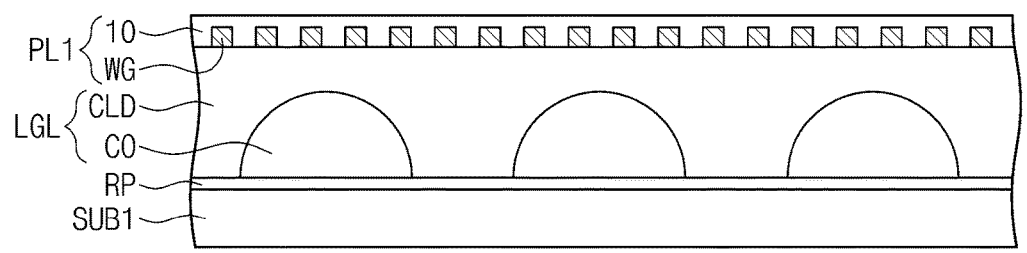

Referring to FIGS. 8D to 8E, the first polarizing layer PL1 is provided or formed on the refractive layer CLD. In such an embodiment, the grid patterns WG are provided or formed on the refractive layer CLD at regular intervals, and the first insulating layer 10 is provided or formed on the refractive layer CLD to cover the grid patterns WG.

Figure 8F:
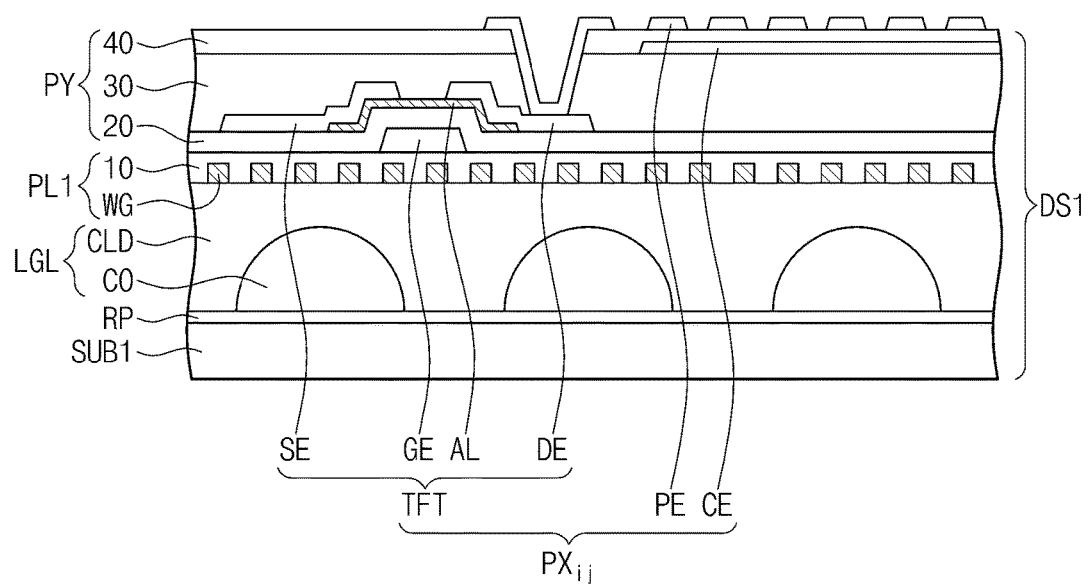

Referring to FIG. 8F, the pixel layer PY is provided or formed on the first insulating layer 10. In such an embodiment, a pixel pattern corresponding to the pixel layer PY, the common electrode CE, and the pixel electrode PE are provided on the first insulating layer 10 by patterning.

Figure 8G:
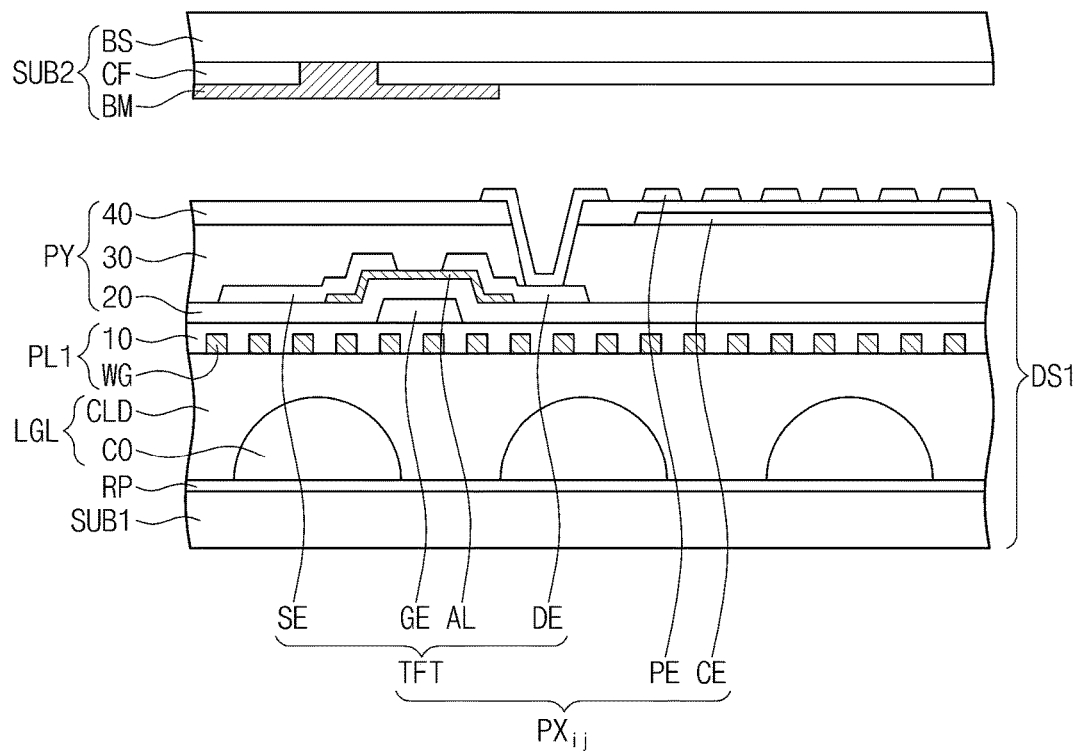

Referring to FIG. 8G the second substrate SUB2 is provided. The color filter CF and the black matrix BM may be patterned on the base substrate BS. The base substrate BS is disposed to face the first substrate SUB1.

Figure 8H:
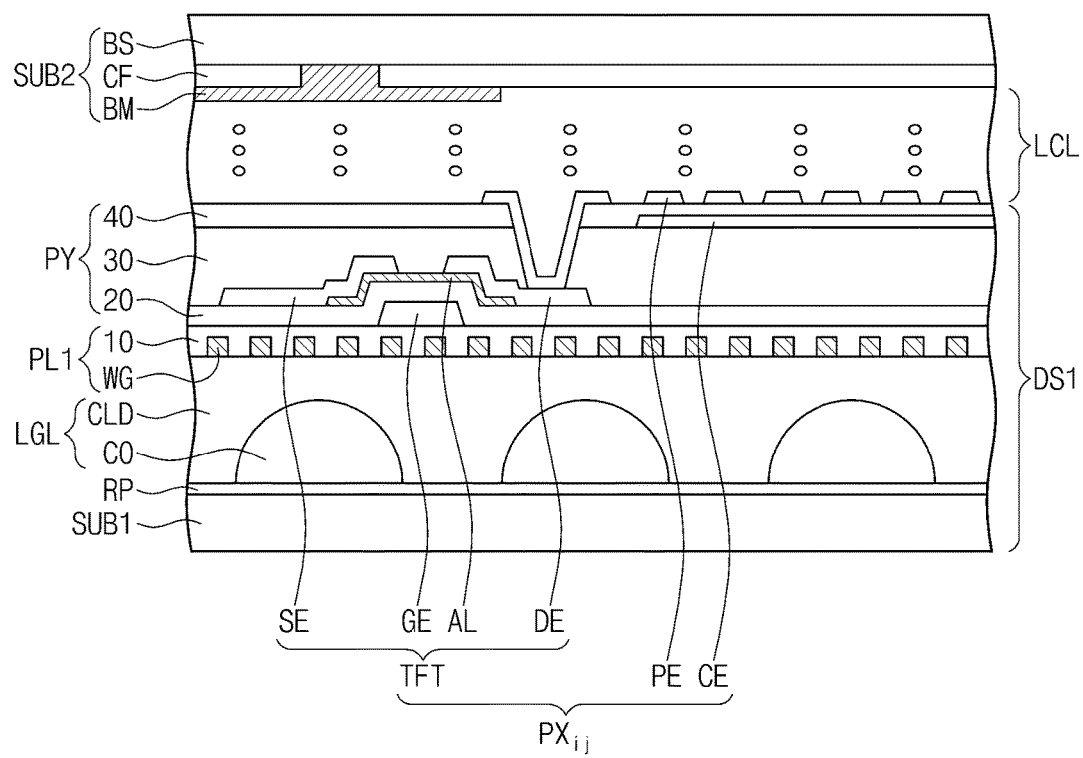

Referring to FIG. 8H, the first substrate SUB1 and the second substrate SUB2 are coupled to each other. Then, the liquid crystal is injected between the pixel layer PY and the second substrate SUB2 to form the liquid crystal layer LCL.

Figure 8I:
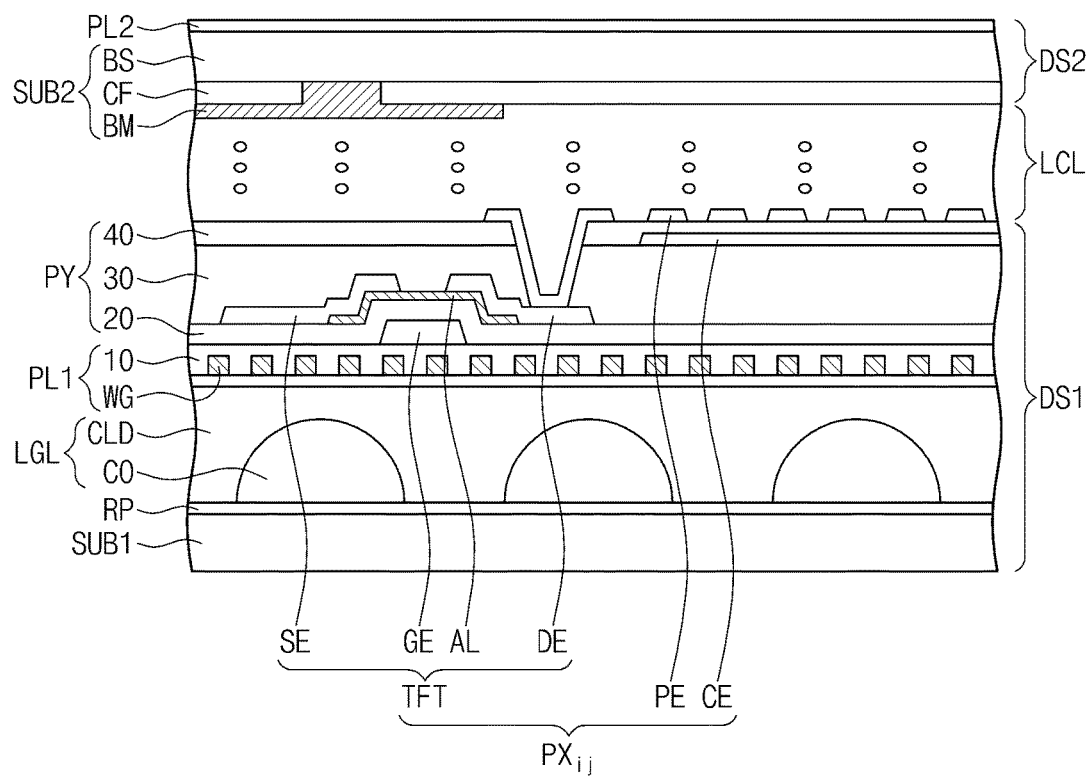

Referring to FIG. 8I, the second polarizing layer PL2 is formed on the second substrate SUB2. The first polarizing layer PL1 and the second polarizing layer PL2 are disposed to face each other such that the pixel pattern is interposed between the first and second polarizing layers PL1 and PL2.

Figure 9:
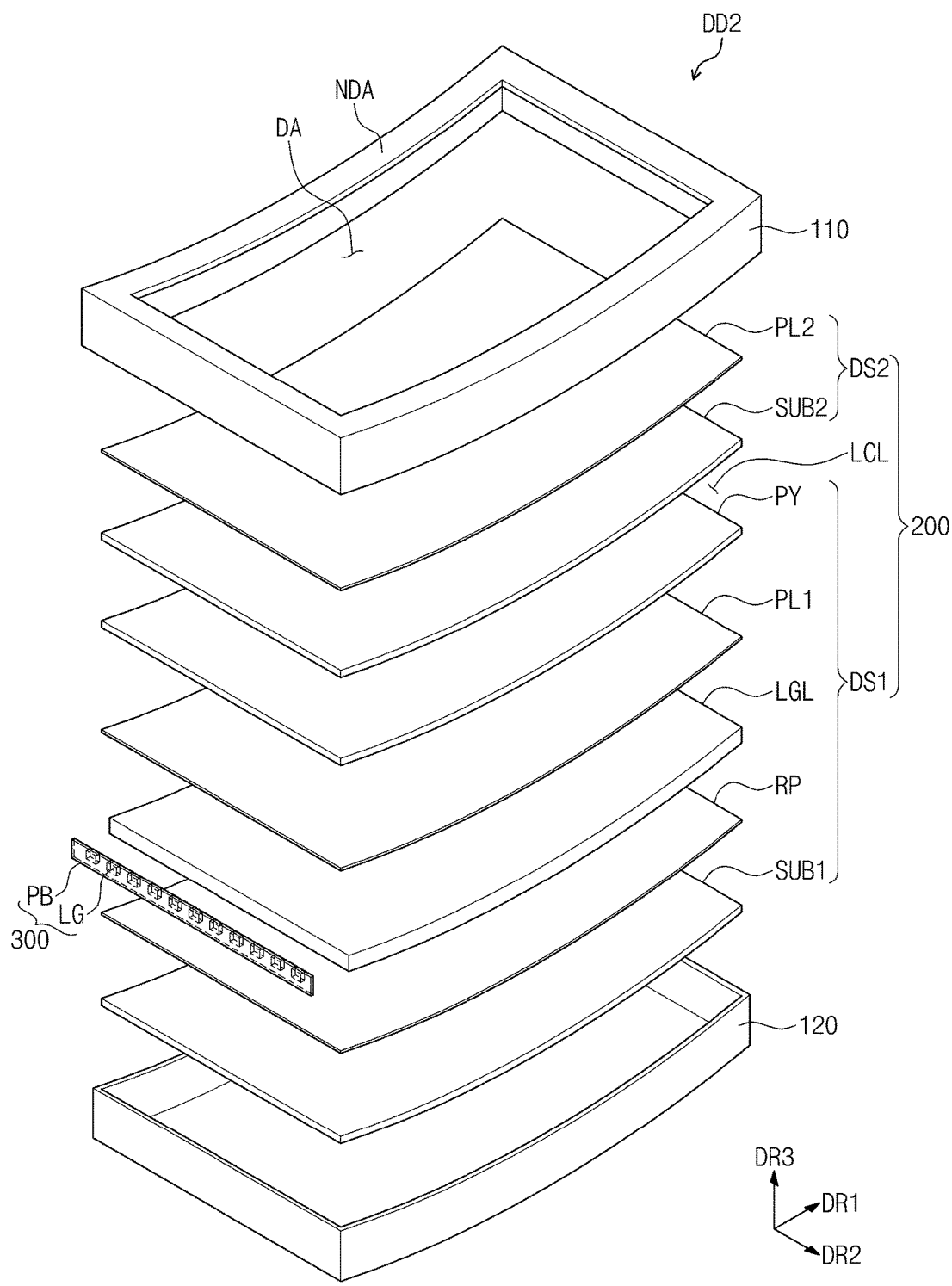
FIG. 9 is an exploded perspective view showing a display device according to another exemplary embodiment of the disclosure.

FIG. 9 is an exploded perspective view showing a display device DD2 according to another exemplary embodiment of the disclosure.

Referring to FIG. 9, the display device DD2 has a curved shape along a first direction DR1, which may be provided by bending the display device DD shown in FIG. 2. In such an embodiment, the display device DD2 shown in FIG. 9 may have a flexible property.

In an exemplary embodiment, the display device DD2 does not include a backlight unit including an additional optical member that provides light emitted from a light source 300 to a pixel layer PY, and thus a thickness of the display device DD2 is reduced.

In one exemplary embodiment, for example, a plurality of light tunnels CO included in the display panel 200 has a thickness smaller than that of a conventional light guide plate and is disposed on a reflection layer RP. In such an embodiment, the display device DD2 does not include a backlight unit including an additional optical sheet that diffuses and scatters the light emitted from the light source 300 to the pixel layer PY.

Accordingly, in exemplary embodiments, the overall thickness of the display panel 200 is reduced, and the curved property of the display device DD2 is improved.

Although the exemplary embodiments of the disclosure have been described, it is understood that the disclosure should not be limited to these exemplary embodiments but various changes and modifications can be made by one ordinary skilled in the art within the spirit and scope of the disclosure as hereinafter claimed.

What is claimed is:

1. A display device comprising:
a light source which emits a light; and
a display panel which displays an image using the light, wherein the display panel comprises:
a first substrate;
a second substrate disposed to be spaced apart from the first substrate;
a plurality of pixels disposed between the first substrate and the second substrate;
a light guide layer disposed between the first substrate and the pixels; and
a reflection layer disposed between the first substrate and the light guide layer,
wherein the light guide layer comprises:
a plurality of light tunnels which receives the light from the light source; and
a refractive layer which covers the light tunnels.

2. The display device of claim 1, further comprising:
a first polarizing layer disposed on the light guide layer; and
a second polarizing layer disposed to be spaced apart from the first polarizing layer such that the pixels are disposed between the first and second polarizing layers,
wherein one polarizing layer of the first polarizing layer and the second polarizing layer comprises a plurality of grid patterns.

3. The display device of claim 2, wherein the one polarizing layer comprising the grid patterns is disposed on the light guide layer.

4. The display device of claim 3, wherein the other polarizing layer of the first and second polarizing layers is disposed on the second substrate.

5. The display device of claim 1, wherein the light tunnels are disposed on the reflection layer and spaced apart from each other at regular intervals.

6. The display device of claim 1, wherein the light tunnels have a refractive index higher than a refractive index of the refractive layer.

7. The display device of claim 1, wherein the light tunnels comprise a transparent conductive oxide material.

8. The display device of claim 7, wherein the refractive layer is a transparent organic insulating layer.

9. The display device of claim 1, wherein the first substrate comprises a metal material.

10. The display device of claim 1, wherein the display panel is curved in a direction.

11. A display device comprising:
a light source which emits a light; and
a display panel which displays an image using the light, wherein the display panel comprises:
a first substrate;
a second substrate disposed to be spaced apart from the first substrate;
a plurality of pixels disposed between the first substrate and the second substrate; and
a light guide layer disposed between the first substrate and the pixels,
wherein the light guide layer comprises:
a plurality of light tunnels which receives the light from the light source; and
a refractive layer which covers the light tunnels, wherein the light source comprises:
a printed circuit board; and
a light emitting device disposed on the printed circuit board and facing a side surface of the light guide layer, wherein the light emitting device emits the light through the side surface of the light guide layer.

12. A method of manufacturing a display device, the method comprising:
preparing a first substrate;
providing a light guide layer on the first substrate;
providing a plurality of pixels on the light guide layer;
preparing a second substrate;
providing a reflection layer on the first substrate, wherein the reflection layer is disposed between the first substrate and the light guide layer; and
coupling the first substrate and the second substrate,
wherein the providing the light guide layer comprising:
providing light tunnels on the first substrate; and
providing a refractive layer on the first substrate to cover the light tunnels.

13. The method of claim 12, further comprising:
providing a first polarizing layer on the light guide layer, wherein the providing the first polarizing layer comprises:
providing a plurality of grid patterns on the refractive layer; and
providing a first insulating layer to cover the grid patterns.

14. The method of claim 13, further comprising:
providing a second polarizing layer disposed to be spaced apart from the first polarizing layer on the second substrate such that the pixels are disposed between the first polarizing layer and the second polarizing layer.

15. The method of claim 12, wherein the light tunnels have a refractive index higher than a refractive index of the refractive layer.

16. The method of claim 12, wherein the first substrate comprises a metal material.

17. The method of claim 12, wherein the light tunnels comprise a transparent conductive oxide material.

\* \* \* \* \*